United States Patent [19]

Jenkins

[11] 3,800,323

[45] Mar. 26, 1974

[54] CASSETTE TAPE TRANSPORT WITH PIVOTALLY SUPPORTED UNIVERSALLY ADJUSTABLE HEAD AND UPRIGHT FRONT-MOUNTED CASSETTE

[75] Inventor: John P. Jenkins, Towanda, Ill.

[73] Assignee: International Tapetronics Corporation, Bloomington, Ill.

[22] Filed: Mar. 24, 1972

[21] Appl. No.: 237,762

[52] U.S. Cl. .......... 360/96, 360/109

[51] Int. Cl. .......... G11b 15/18, G11b 15/29

[58] Field of Search .......... 179/100.1 VC, 100.1 CA, 179/100.1 Z; 274/4 E, 4 C, 1 C

[56] References Cited

UNITED STATES PATENTS

| | | | |
|---|---|---|---|
| 3,684,295 | 8/1972 | Strain | 274/4 C |
| 3,612,432 | 10/1971 | Johnson | 274/4 E |
| 3,624,308 | 11/1971 | Koza | 179/100.1 VC |

FOREIGN PATENTS OR APPLICATIONS

| | | | |
|---|---|---|---|
| 1,254,377 | 11/1967 | Germany | 242/188 |

*Primary Examiner*—Louis R. Prince
*Assistant Examiner*—A. Jason Mirabito
*Attorney, Agent, or Firm*—Davis, McCaleb & Lucas

[57] ABSTRACT

A swing arm supports a sound transducer head and a pinch roller for pivotable movement between three positions as follows: a recording and reproducing position in which both the head and pinch roller engage the tape, and tape speed is regulated by a capstan; a scanning position in which only the head engages the tape to enable monitoring it at speeds independent of the capstan; and an inactive position in which the head and pinch roller are both out of engagement with the tape. The swing arm is spring-biased toward the inactive position and is movable to either of the other positions by solenoids. A simplified adjustment, using only three adjusting screws, provides optimum zener, azimuth, and transversely-centered relationships between the head and tape. A cassette is mounted in an upright, fully visible and accessible operating position. Deflectible retaining members automatically engage the cassette and hold it in operating position.

6 Claims, 15 Drawing Figures

CASSETTE TAPE TRANSPORT WITH PIVOTALLY SUPPORTED UNIVERSALLY ADJUSTABLE HEAD AND UPRIGHT FRONT-MOUNTED CASSETTE

CROSS REFERENCES TO RELATED APPLICATIONS

Reference is made to the following co-pending,

Jenkins Appln. Ser. No. 237,707, Filed Mar. 24, 1972 on COMPACT CASSETTE TAPE TRANSPORT WITH DIRECT CAPSTAN AND TORQUE MOTOR DRIVES Jenkins Appln. Ser. No. 341,769, Filed Mar. 15, 1973 on TAPE TRANSPORT WITH AUTOMATIC TORQUE MOTOR BRAKE Jenkins Appln. Ser. No. 344,180, Filed Mar. 23, 1973 on AUTOMATIC SEQUENCE CONTROL FOR REPRODUCING APPARATUS Jenkins Appln. Ser. No. 349,677, Filed Apr. 10, 1973 on CASSETTE TAPE TRANSPORT WITH UNIVERSALLY ADJUSTABLE HEAD AND UPRIGHT FRONT-MOUNTED CASSETTE.

This invention relates to tape recording and reproducing apparatus for a "cassette"-type cartridge containing a magnetic tape with opposite ends wound on a pair of reels, and it relates particularly to a tape transport having a pivotal support for a pinch roller and for a universally adjustable head and having a cassette in fully visible, accessible, front-mounted, upright operating position.

The invention is concerned with a high quality tape transport for use in radio broadcasting and the like where a wide variety of cassettes must be handled during a broadcasting program. An engineer or program operator will have several tape transports before him. While one is playing, he will insert and remove cassettes in others, and ready them to play specific cuts at proper times. In some cases, a cassette must be scanned quickly to locate a specific cut or message. It is absolutely essential that this equipment perform quickly, easily, reliably, and without mechanical noise.

In many conventional broadcasting tape transports, cassettes are inserted edgewise through a narrow slot in the control panel, or are placed in a special slidable or pivotable carried for movement into and out of an internal operating position. These are unhandy and any identification on the cassette is completely hidden when it is in operating position.

Conventional tape transports have reciprocating or sliding mechanisms to provide relative motion between the cassette, and the sound transducing head and pinch roller. At best, these are difficult to keep precisely aligned and spaced, and friction-free over extended periods.

To maintain peak recording and reproducing efficiency, the head must be kept precisely spaced and oriented with respect to the tape. Conventional tape transports have relatively complicated adjustments to maintain optimum zener, azimuth, and transversely-centered relations between the head and tape.

BRIEF SUMMARY OF THE INVENTION

A general object of this invention is to provide a simple and reliable cassette tape transport in which a cassette is easily insertable into and removable from a fully visible and accessible upright operating position on a front control panel.

Another object of this invention is to provide such a tape transport where a cassette is held in operating position by deflectible or spring-biased members which are automatically moved into and out of holding engagement with the cassette when the cassette is manually inserted and removed.

Another object is to provide such a tape transport in which both a sound transducer head and a pinch roller are carried on a pivoted swing arm to minimize friction and wear and to maintain close tolerances relative to a fixed cassette which are unattainable in conventional sliding or reciprocating supports.

Another object is to provide a tape transport in which the head is movable into signal-receiving proximity with the tape while the tape is free of the capstan, thereby enabling the tape to be driven at relatively high speed to scan it quickly and locate a particular message or cue tone.

Another object is to provide a simplified universal head adjustment using only three screws to make zener, azimuth and centering adjustments relative to the tape.

Another object is to provide improved means for supporting and adjusting tape guide fingers which are movable with the head into and out of engagement with the tape.

Another object is to provide an improved light shield for an optical tape presence detector associated with the head.

Other objects and advantages will be apparent from the following description taken in connection with the drawings in which.

Figures 1, 2, 5, 6:
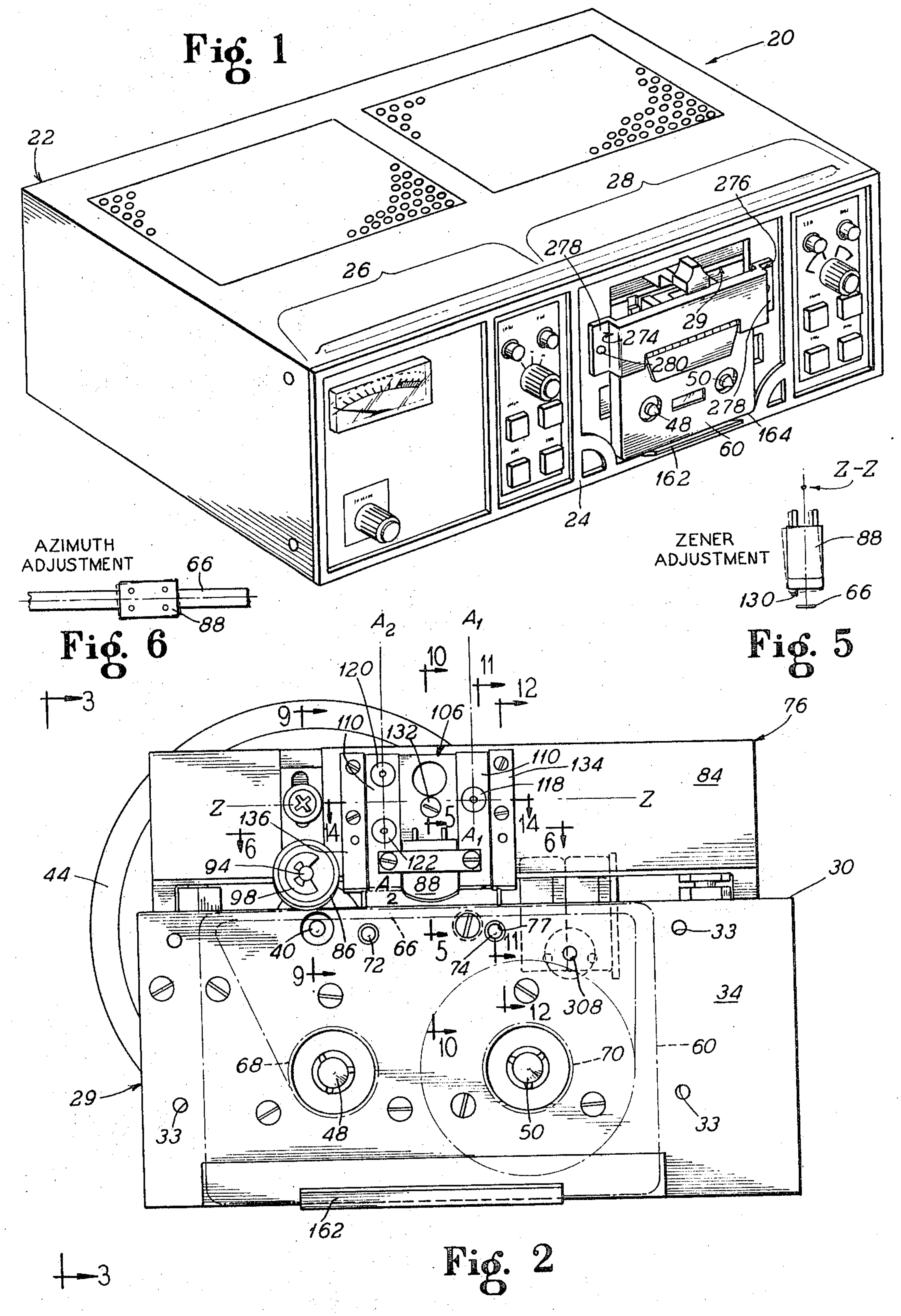
FIG. 1 is a perspective view of a recorder and reproducer employing a tape transport illustrating a preferred form of the present invention.
FIG. 2 is a fragmentary front view of FIG. 1 with portions stripped away to expose the tape transport and to show the cassette support and the swing arm on which the pinch roller and sound transducer head are supported.
FIG. 5 is an outline view of the head and tape taken along line 5—5 of FIG. 2 illustrating zener adjustment.
FIG. 6 is an outline view of the head and tape taken along line 6—6 of FIG. 2 illustrating azimuth adjustment.
Figure 13:
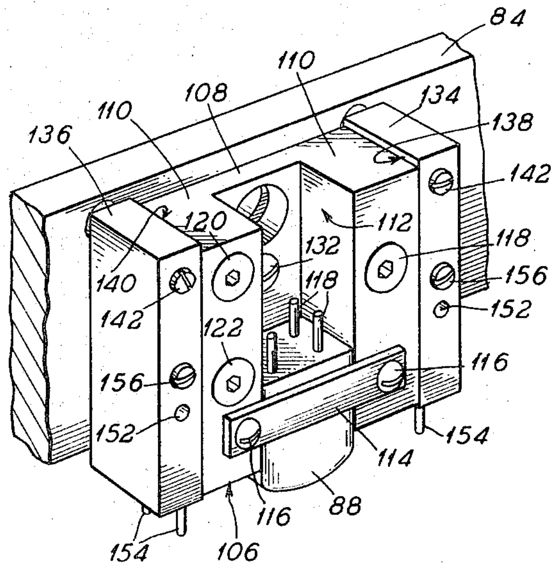
Figure 14:
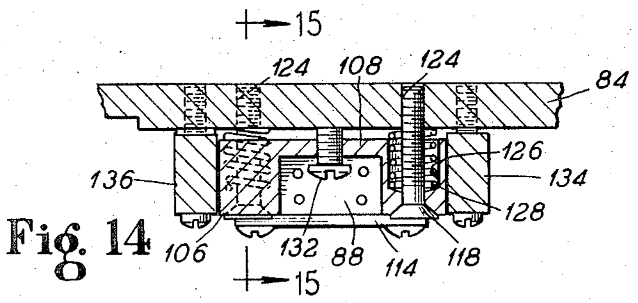
Figure 15:
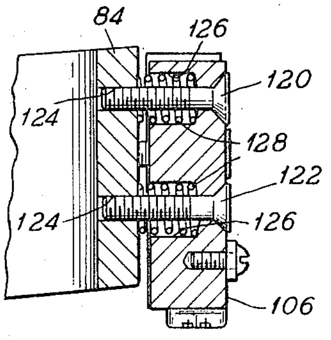

FIGS. 9, 10, 11 and 12 are fragmentary vertical cross-sectional views of FIG. 2 taken along lines 9—9, 10—10, 11—11 and 12—12, respectively;

FIG. 13 is an enlarged fragmentary perspective view of FIG. 2 showing the sound transducer head and its immediate supporting and adjusting components;

FIG. 14 is an enlarged fragmentary horizontal sectional view of FIG. 2 taken along line 14—14; and FIG. 15 is a vertical sectional view of FIG. 14 taken along the line 15—15.

Like parts are referred to by like reference characters throughout the figures of the drawings.

DETAILED DESCRIPTION OF THE PREFERRED EMBODIMENT

A preferred embodiment of the invention as shown in the drawings will now be described. A recorder and reproducer 20 incorporates a tape transport 29 which illustrates a preferred form of the invention. It has a housing 22 with a front control panel 24 comprising a recording portion 26 and a reproducing portion 28.

Only the reproducing portion 28 is of special interest in connection with the present invention.

The tape transport 29 includes a main motor supporting frame generally designated 30, a capstan motor 44, a pair of torque motors 52 and 54, and a swing arm 76. The frame 30 is held in place by bolts 32 (FIG. 4) extending forwardly through bolt holes 33 (FIG. 2) into the front panel 24 of the housing.

Figure 3:
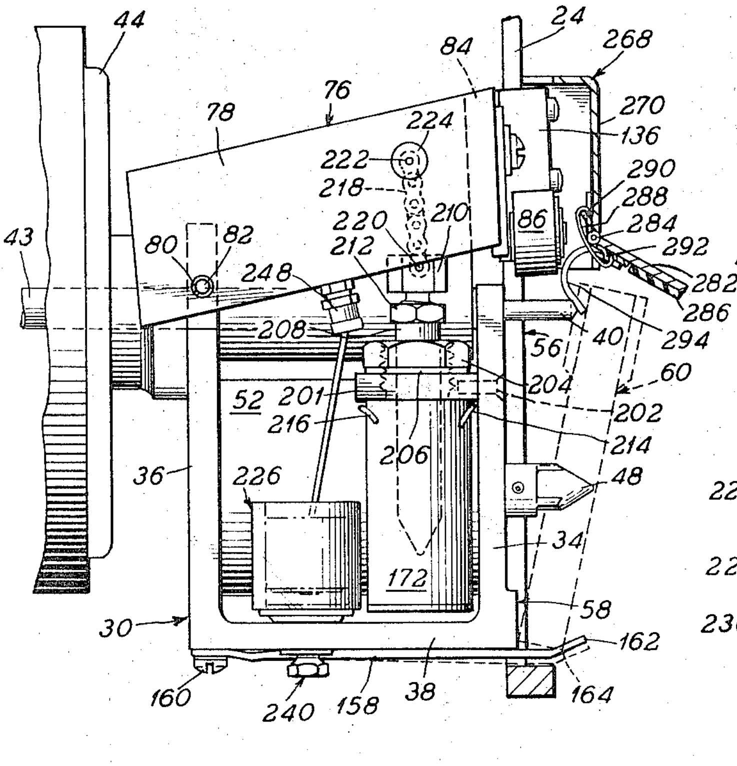
FIG. 3 is a side view of FIG. 2 as seen in the direction of the arrows 3—3.

As best shown in FIG. 3, the motor supporting frame 30 is U-shaped in cross section. It has an upright forward wall 34 (connected to the front panel by bolts 32 as described above), an upright rearward wall 36, and a bottom wall 38 rigidly interconnecting the two upright walls.

A capstan 40 extends forwardly beyond forward wall 34 and is carried on the motor frame by an extended bearing support 42. The capstan is directly connected to the shaft 43 of capstan motor 44 which is held by bolts 46 on the rearward wall 36. A pair of reel-engaging spindles 48 and 50 extend forwardly from wall 34, being directly driven by torque motors 52 and 54 mounted between walls 34 and 36.

Figure 11:
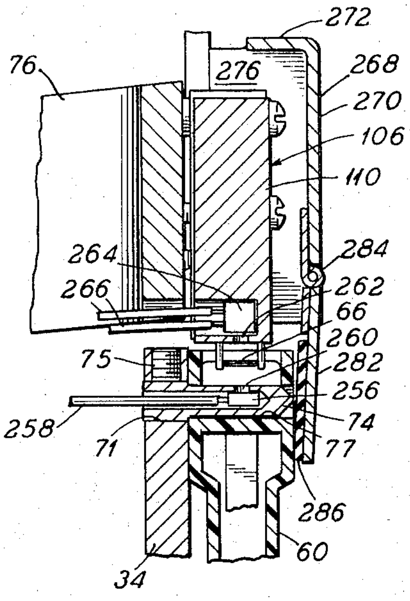

The forward wall 34 has a major upper front surface portion 56 and a minor lower front surface portion 58 disposed to mount a cassette 60 in an upright operating position. The cassette illustrated conforms to the standards of the National Association of Broadcasters. The standard dimensions and characteristics of that cassette will not be repeated here in detail. For the purposes of the present description, it has a plastic case 62, a magnetic tape 64 with a central run 66 having its opposite ends wound upon reel hubs 68 and 70. When the cassette is in the upright operating position against the front surfaces of wall 34, the hubs are engaged respectively with the torque motor spindles 48 and 50; the central run 66 is trained across the capstan 40 which extends into the case; and a pair of locating pins 72 and 74, mounted in the front wall 34, will be fitted in detent openings formed in the case. As shown in FIG. 11, each pin 72 and 74 is held in an opening 71 in forward wall 34 by a set screw 75.

A swing arm generally designated 76 is U-shaped in plan view (FIG. 4), having a pair of lever portions 78, 78 interconnected at their forward, free ends by a cross portion 84. Each lever portion 78 has an end located in a recess 79 in rearward wall 36 and has a bore 80 journaled about a pivot pin 82 enabling the swing arm 76 to pivot up and down about pins 82.

Figure 9:
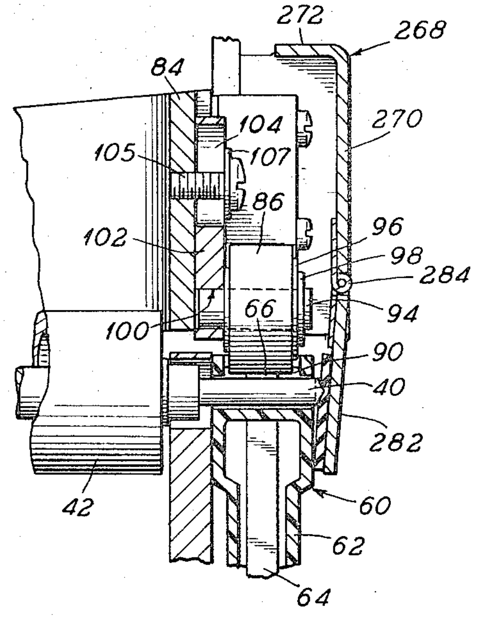
Figure 10:
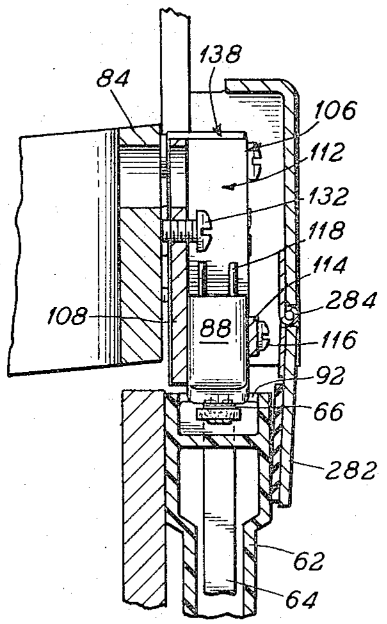

A pinch roller 86 and a sound transducer head 88 (used for recording or reproducing, or both) are carried on the forward side of the cross portion 84. As shown in FIGS. 9 and 10, these are engageable with the central run 66 of the tape through openings 90 and 92 in the upper edge of the cassette case 62, provided for that purpose. The pinch roller 86 is in the same vertical plane with the capstan 40, enabling it to press the tape central run 66 against the capstan, as shown in FIG. 9.

Means for mounting the pinch roller and head on the swing arm and adjusting them relative to the tape will now be described.

The pinch roller 86 has a rubber or rubber-like annular outer portion and is rotatably journaled on a stub shaft 94. It is held in place by an annular washer 96 and a C-clip 98 engaged within a groove in the stub shaft. The stub shaft is mounted by brazing or a press fit in a hole 100 in a vertically adjustable slide member 102. This has a slot 104 through which a retaining bolt 105 extends into threaded engagement with the swing arm cross portion 84. A washer 107 is under the head of bolt 105. Thus, the pinch roller 86 can be adjusted vertically by loosening the bolt 105 and moving the slide member 102 up or down relative to the bolt.

The head 88 is adjustable up and down in a mounting block 106 which is universally adjustable by means which will now be described.

Figure 4:
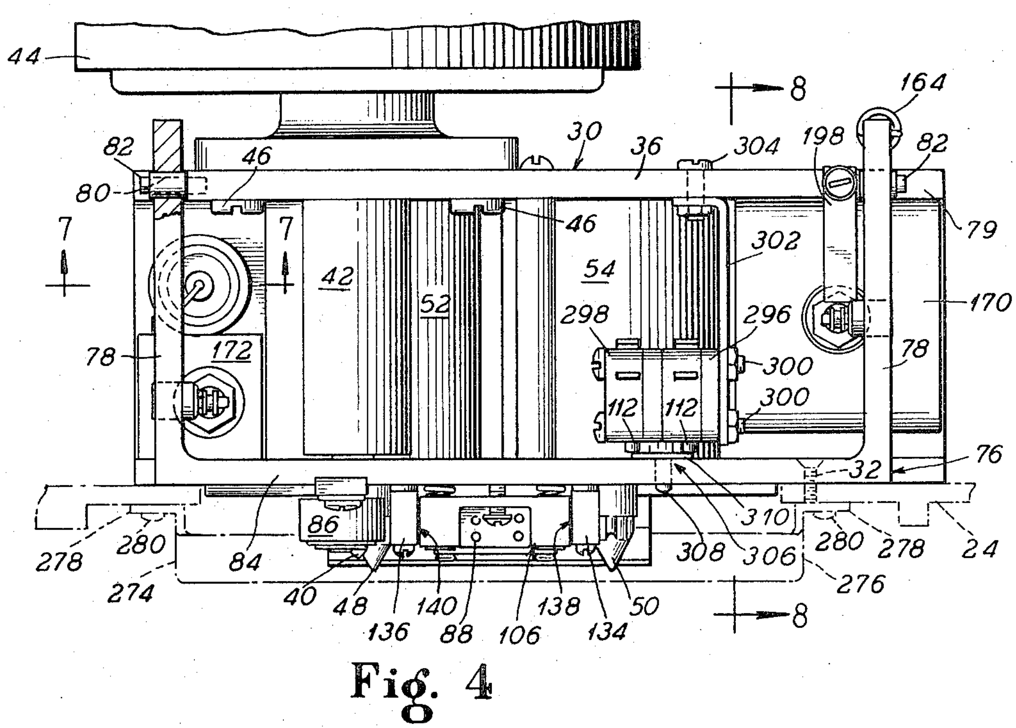
FIG. 4 is a top plan view of FIG. 3.

The mounting block 106 is U-shaped as seen from the top (FIGS. 4, 13 and 14). It has a base portion 108 and outstanding sidewall portions 110 flanking a central, vertical, open-sided and open-ended groove 112. The head 88 fits snugly within the groove and is held in place by a small cross bar 114 tightened against the head by screws 116. In operation, prongs 118 of the plug will be seated in a receptacle (not shown) to provide suitable electrical communication with the head.

As best shown in FIG. 2, the mounting block 106 is fastened to the cross portion 84 by adjusting screw means in each sidewall portion 110. The adjusting screw means on the right-hand side (FIG. 2) comprises a single screw 118. The adjusting screw means on the left-hand side comprises a pair of screws 120 and 122 which are respectively equidistant from a horizontal axis Z—Z which passes through the screw 118 and which may be referred to as the "zener" axis for a reason to be described. Vertical axes $A_1$—$A_1$ and $A_2$—$A_2$ are shown in FIG. 2 passing respectively through the right-hand and left-hand adjustment screw means described. These may be referred to as "azimuth" axes for a reason to be described.

As best shown in FIGS. 14 and 15, each of the adjustment screws 118, 120, and 122 is threadedly engaged with a tapped bore 124 in the cross portion 84. Each adjustment screw extends through a counterbore recess 126 in the back side of the mounting block 106, each recess containing a compression spring 128 seated between the cross portion 84 and the inner end of the corresponding recess 126. This urges the mounting block and head forward. Thus, tightening any of the screws moves the corresponding portion of the mounting block inward; loosening it causes the mounting block to move outward under the bias of its spring.

Zener adjustment will now be described. Zener is the angular relationship between the head face and the tape as seen in a vertical plane which is perpendicular to the longitudinal centerline of the tape. These should be parallel, as shown in solid lines in FIG. 5. To adjust zener, one of the adjusting screws 120 and 122 will be tightened while the other is correspondingly loosened, causing the entire mounting block 106 and head 88 to rotate about the zener axis Z—Z until the desired parallelism is obtained, as shown in FIG. 5.

Azimuth adjustment will now be described. Azimuth (or skew) is the angular relation between the longitudinal centerlines of the head and the tape as seen in a plan view. These should be parallel, as shown in solid lines in FIG. 6. To adjust the azimuth, one of the adjustment screw means 118; or 120 and 122; or both, will be loosened or tightened. If screw 118 is adjusted, the mounting block will pivot about a vertical azimuth axis $A_2$—$A_2$. Conversely, if the screws 120, 122 are adjusted, the mounting block will pivot about azimuth axis $A_1$—$A_1$. Both zener and azimuth adjustments may shift the head slightly in or out relative to the centerline of the tape requiring an additional final adjustment of all three screws in one direction or the other to make their centerlines coincide, as seen in a plan view. When the adjustment is correct, the position of the mounting block is then locked in place by tightening lock screw 132 which is threaded into the base 108 of the mounting block and which has its inner end bearing against the cross portion 84 (FIG. 10). The lock screw 132 is preferably positioned within a triangular area determined by the three adjustment screws 118, 120, and 122 (see FIG. 2).

Figure 12:
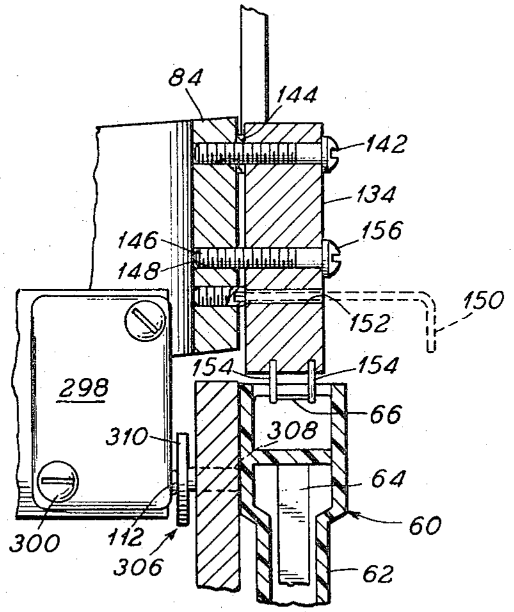

Combined means for guiding the mounting block and the tape will now be described. Vertical guide bars 134 and 136 are mounted on the swing arm cross portion 84 and have parallel sidewall surfaces 138 and 140 substantially perpendicular to the central tape run 66 and engaging the corresponding sides of the mounting block 106. This engagement is quite precise and snug, as shown in FIG. 4 and FIG. 13, restricting relative movement between the mounting block and the guides only to that required for zener, azimuth, and transverse-centering adjustments described above. Each guide bar 134 and 136 is fastened to the cross portion 84 by an upper screw 12. As shown in FIG. 12, a washer 144 provides a pivot member about which the corresponding guide bar can be adjusted. A small socket head set screw 146 is threadedly engaged within a tapped bore 148 behind each of the guide bars 134 and 136. The outer, forward end of the set screw bears against the inner, rear surface of the guide bar and its socket head is accessible to a hexagonal cross section tool 150 through an aligned bore 152.

At the bottom of each guide bar 134 and 136, a pair of vertical, parallel, spaced guide fingers 154, 154 are carried by the guide bar in any suitable manner as by a press fit or brazing in underside, bored holes. These guide fingers are hardened, non-magnetic stainless steel pins providing guidance for the edges of the central tape run 66 when the swing arm 76 is moved down to press the head against the tape.

The guide fingers 154, 154 can be moved forward and backward (that is, toward and away from an operator in front of the control panel 24) to center the tape relative to the head, by adjusting the set screw 146 in and out. Proper centered position can then be held by tightening lock screws 156.

Figure 8:
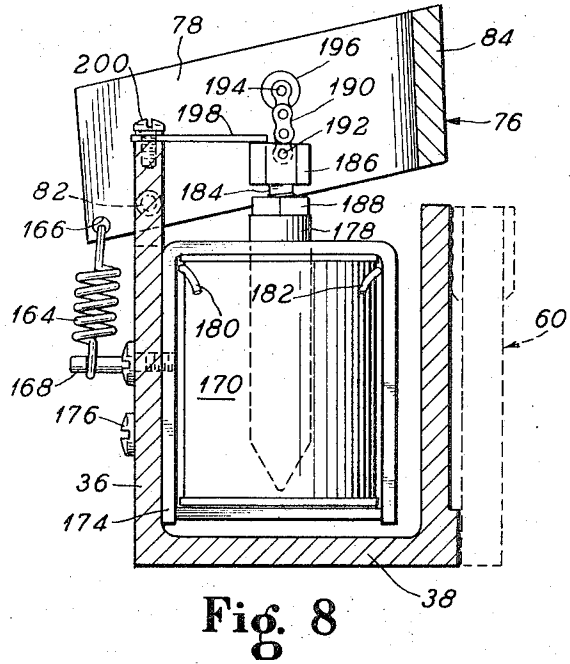
FIG. 8 is a vertical cross-sectional view of FIG. 4 taken along the line 8—8.

An important feature of the present invention which enables an operator to manually insert and remove a cassette 60 quickly and easily is a spring plate 158 fastened by screws 160 at the rear of the bottom wall 38. This spring plate has a forward, upwardly inclined extension 162 which grips the lower front corner 164 of the cassette to hold it in operating position. To insert the cassette with a single, easy, continuous motion, it is first placed in the angular position shown in FIG. 3, and pressed toward the panel into the upright operating position shown in FIG. 8. This engages the locating pins 72, 74, the capstan 40, and the spindles 48, 50 with matching portions of the cassette. As the cassette is so inserted, the spring plate 158 deflects downward to the broken line position and then deflects upward to the solid line position shown in FIG. 3. Frictional engagement with the pins and spindles, combined with the bias exerted by the spring plate extension 162 on the corner of the cassette holds it firmly but removably in place. Additional, automatically operable retaining plate means engageable with the upper part of the cassette will be described in connection with a light shield.

The swing arm 76 is biased upwardly (counterclockwise about pivot pins 82) by a tension spring 164 hooked between an aperture 166 in one of the swing arm lever portions 78 and a horizontal post 168 mounted on the back of rearward wall 36. The spring 164 thereby biases the swing arm to an inactive position shown in FIGS. 2 and 3 where the pinch roller 86 and head 88 are completely disengaged from the central tape run 66 in the cassette.

The swing arm 76 is moved downwardly (clockwise about pivot pins 82 in FIG. 3) a maximum amount to a recording and reproducing position where the pinch roller 86 and head 88 are fully engaged with the tape as shown in FIGS. 9 and 10; or an intermediate amount, to a scanning position (not shown), where the head is in receiving proximity with the tape but the pinch roller is disengaged from it thereby enabling the torque motors to run the tape at high speed while the operator monitors it to locate or identify a particular cut.

The frame 174 of the main solenoid 170 is held on the rearward wall 36 by one or more screws 176.

The main solenoid 170 has a vertical armature or plunger 178 and the solenoid is energized through conductors 180, 182. The specific control circuit for this solenoid as well as the other electrical components forms no part of the present invention so is omitted from this description.

A connecting screw 184 with a large head 186 is threadedly engaged into the top of plunger 178 and is held in an adjusted position relative to the plunger by a lock nut 188. A short length of chain 190 is connected respectively by pins 192, 194 between the head 186 and a lug 196 carried by one of the lever portions 78. A stop finger 198 is fastened to the top of rearward wall 36 by a screw 200 and is engageable with the top of head 186 to simultaneously limit upward movements of the swing arm 76 and the solenoid plunger 178.

The lock nut 188 will be so adjusted that, when activated, the main solenoid 170 will pull the swing arm 76 down to move the pinch roller 86 and head 88 into full operating engagement with the tape. This will press a portion of the central tape run 66 firmly into frictional engagement with the capstan 40 to limit tape speed to that determined by the capstan motor.

The auxiliary solenoid 172 is somewhat smaller than the main solenoid because it is not required to hold the pinch roller against the tape with sufficient pressure to control the speed by the capstan. It has an upper, integral coller 201 held to the forward wall 34 by a screw 202. The auxiliary solenoid is cylindrical and has a top hexagonal nut 204 with a washer 206 between it and the coller 201, holding the solenoid firmly in place.

The auxiliary solenoid 172 has a vertically movable plunger 208. A hexagonal head 210 is at the top of vertical adjustment rod threaded into a tapped bore (not shown) in plunger 208. A hexagonal lock nut 212 is threaded onto said adjustment rod and is jammed against the top of plunger 208 to hold the head 210 spaced a preselected distance above the plunger. When solenoid 172 is activated, the inner end of the plunger is stopped by the inner bottom end of the solenoid casing. The lock nut 212 therefore provides vernier adjustability for the limit of movement of the swing arm 76 by the auxiliary solenoid. As with the main solenoid, a short length of chain 218 is fastened by pins 220, 222 between the head 210 and a lug 224 carried by one of the swing arm lever portions 78.

In adjusting the auxiliary solenoid 172 for use with this invention, the hex head 210 is rotated to move the adjustment rod up or down within the plunger so that, when the solenoid is activated to bottom the plunger 208, it will pull the swing arm frame down an intermediate distance, sufficiently to hold the head 88 in listening proximity to the tape, without causing the pinch roller to press the tape into frictional engagement with the capstan. This is the scanning position during which one or the other of the torque motors 52, 54 can run the tape in fast forward or fast reverse mode. A tape can be scanned in less than 1/50 its normal running time.

It is important for the tape transport to operate with an absolute minimum of mechanical noise. For this purpose, all the moving parts are made with a high degree of precision and no unnecessary slap or clearance is permitted between moving parts. Further, a dashpot means generally designated 226 cushions movement of the swing arm in both directions.

Figure 7:
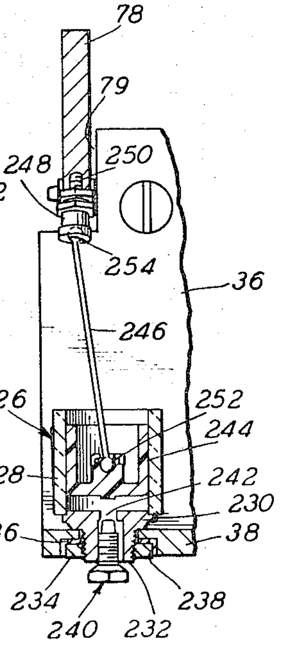
FIG. 7 is a fragmentary vertical cross-sectional view of FIG. 4 taken along the line 7—7.

The dashpot mechanism is best shown in FIGS. 3, 4 and 7. It has a cylindrical body 228 with a lower end wall 230 having a threaded extension 232 extending through an opening in the bottom frame wall 38 and held firmly in place by a nut 234 and washer 236 in a counterbore 238. A needle valve 240 regulates air flow through an opening 242 in the end wall. A piston 244 is movable up and down within the cylinder. It is connected by a push-pull rod 246 to an anchor fitting 248 fastened as by screw 250 to the lower edge of one of the swing arm lever portions 78 through ball joints 252 and 254. Adjustment of the needle valve 240 regulates the speed of the swing arm.

The standard NAB cassette has a clear leader twelve to fifteen inches long at each end of the tape for use with an end-sensing control. In the present invention, as best shown in FIGS. 2 and 11, locating pin 74 is hollow and contains a miniature infrared lamp 356 connected by electrical conductor means 258 to an electrical power source (not shown). The light is directed through an upper opening 260, through the central tape run 66 when the clear leader is present, into an opening 262 in the bottom of the righthand sidewall portion 110 of the mounting block 106, into a chamber containing an infrared light sensor 264. The resulting signal, through conductor means 266 is then picked up and amplified by a control circuit (not shown) to indicate the end of the tape or activate the tape transport in response to same. An infrared sense is preferred for this application, because it responds minimally to normal ambient visible light.

Infrared sensors have some response to other wave lengths which may be present in a broadcasting studio or control room. In addition, other equipment in a tape transport area may generate some infrared radiation causing a spurious response in the senser 264. This is possible, especially where broad band infrared sensing is employed. Accordingly, it is highly desirable to shield the light senser 264 from ambient light. An important feature of this invention is that it provides such a shield extending far down over the top of the cassette, covering the cassette opening 77 (FIG. 11) for the locating pin 74, yet does not interfere with the placement and removal of the cassette. As an additional feature, the light shield has a hinged extension which retains the cassette in operating position, this hinged extension being automatically movable into and out of place in response to manual insertion or removal of the cassette. This will now be described.

Referring now to FIGS. 1, 3, 9, 10, and 11, a light shield 268 has a front vertical wall 270, a top horizontal wall 272, side vertical walls 274, 276 and vertical end flanges 278 held onto the front panel 24 by screws 280.

The light shield 268 has a lower extension comprising a retaining plate 282 along its lower margin, held by a horizontal hinge 284. Note that the retaining plate 282 extends substantially down below the top of the cassette anc covers the opening 77 around the locating pin 74 containing the infrared source 256. This assures that no stray light will enter the cassette opening and be reflected up into the sensor 264. A sheet of "mu" metal 286, of electric or magnetic shielding material, is adhered to the inner surface of the retaining plate 282 to reduce electrical noise in the head and to improve the light shielding properties.

Refer to FIG. 3. A generally C-shaped formed wire spring 288 is connected between anchor points 290 and 292 on the insides of wall 270 and plate 282. The action of this spring is overcenter, causing the retaining plate 282 to seek either of two stable positions: a first position pressed into engagement with the cassette as shown in FIGS. 9, 10, and 11; and a second position as shown in FIG. 3 where it is wide open, ready to receive a cassette.

The retaining plate 282 is automatically operable by an internal hook 294 (FIG. 3) attached to it. Thus, as the cassette-insertion step is begun, the cassette will be in the angled position shown in FIG. 3 in and beneath the plate 282, just touching the hook 294. As the operator presses the cassette inward, it engages the hook and pulls the retaining plate 282 after it. The spring 288 then holds the plate 282 overcenter, pressed against the cassette as described above. In removing the cassette, the operator merely grasps it and pulls it outward, moving it from the upright position shown in FIGS. 9 and 10, to the angled position shown in FIG. 3. This deflects the retaining plate 282 outward and upward because of the pressure of the cassette against the inner lining 286. The spring 288 causes it to flip overcenter, upward, free of the cassette, which can then be removed without interference or objectionable noise.

A useful mechanical feature of this invention which enables it to actuate a control circuit (not shown) is shown in FIGS. 2 and 4. A pair of miniature switches 296 and 298 are mounted as by bolts 300 on a bracket 302 which is held to the rearward wall 36 by a bolt 304. A plastic actuating button 306 is provided having a stem 308 extending through an aperture in the forward frame wall 34, and having a flat round head 310 behind the wall and engaging simultaneously the actuating buttons 112 of both switches. As shown in FIG. 12, the actuating button 306 is held displaced inwardly by the cassette when in its upright operating position. This actuates both switches simultaneously and can be employed to control energization of selected motors or components or actuating or disabling certain functions depending on the presence or absence of a cassette in its operating position, ready to record or reproduce.

Summarizing the invention, the record-play head 88 is adjustable in zener, azimuth and centering by the mounting block 106 held in place with three screws which have counter tension against them created by three opposing springs underneath the mounting block. After height, zener and azimuth adjustments are made, the locking screw 132, threaded to the swing arm is tightened to lock all three head adjustments. Two hardened, non-magnetic stainless steel pin tape guides 154 are provided at the front of the transport, one on either side of the tape. The centered position of these guides relative to the head 88 is adjustable and is held by a locking screw 146. The pinch roller 86 is mounted on an adjustable bracket providing a very accurate means of insuring parallelism between the capstan and the pinch roller and thereby providing very exact tracking of tape.

The swing arm assembly 76 is mechanically engaged by the use of two solenoids. Main solenoid 170, when energized, pulls the swing arm assembly forward to a point where the pinch roller contacts the capstan and drives the tape at the selected speed. Auxiliary solenoid 172 pulls the swing arm assembly down to an intermediate position where the head contacts the tape but the pinch roller stops short of the capstan shaft. The auxiliary solenoid may be energized when the recorder and reproducer is placed in the "fast forward" mode to permit scanning the tape for messages or cue tones. A dashpot is connected to the swing arm assembly and its purpose is to damp movement and reduce mechanical noise. The speed at which the swing arm assembly is engaged and disengaged can be regulated with a needle valve 240. The overall rugged construction, and the hinged swing arm, provide a tape transport which will hold adjustment over several years normal use.

While one form in which the present invention may be embodied has been shown and described, it will be understood that various modifications may be made within the spirit and scope of the invention which should be limited only by the appended claims. For instance, while the universally adjustable mounting for the sound transducer head 88 is shown mounted on a pivotal swing arm 76, it will be obvious that the improved head adjustment arrangement may be employed to advantage where the head is mounted on a slidable, reciprocable or stationary frame member. Also, while the frame 30 is shown and described as being a separable portion of the housing 22, it will be obvious that these may be integral or the upright walls 34 and 36 may be attached to or made a part of the housing in some other obvious way not specifically disclosed.

I claim:

1. In a cassette tape transport, a housing having an outside wall with means for detachably supporting a cassette on said wall in an operating position where a run of tape in said cassette is adjacent a capstan carried by said wall;

a swing arm pivoted on said housing supporting a pinch roller in alignment with said capstan, and supporting a head, for swinging movement of said pinch roller and head toward and away from the tape in the cassette;

spring biasing means, main solenoid means, and auxiliary solenoid means supported and acting between said housing and said swing arm;

said spring biasing means urging said swing arm in a direction to move said pinch roller and head away from said capstan;

said main solenoid means being effective when energized to move said swing arm against said spring biasing means sufficiently to engage said head and pinch roller with the tape and press the tape into frictional driving engagement with said capstan;

said auxiliary solenoid means being effective when energized to move said swing arm against said spring biasing means sufficiently to engage said head with the tape but insufficiently to press the tape into frictional driving engagement with said capstan.

2. In a cassette tape transport, the combination of claim 1 in which dashpot means is supported and acting between said housing and said swing arm to cushion the movement of said swing arm.

3. In a cassette tape transport the combination of claim 1, having a continuously visible, highly accessible mounting for a cassette on a front wall of said housing comprising:

a capstan and a pair of spindles extending forwardly from said front wall and engageable respectively with tape and a pair of reels in a cassette in an upright operating position flush against the front surface of said front wall;

means for holding a cassette in said operating position including a pair of stationary locating pins extending forwardly from said front wall and engageable within openings in the cassette, and a spring plate having an inclined forward end portion also extending forwardly from said front wall which is engageable with the bottom forward edge of the cassette and is deflectible during insertion and removal to and from said operating position; and an automatic retaining plate hinged to said front wall above the cassette in said operating position, and being pivotally movable between a closed position against the upper outer surface of the cassette and an open position swung outwardly free of said cassette, overcenter spring means acting between said retaining plate and said front wall holding said retaining plate stably in either position, and an extension carried by said retaining plate which engages a cassette in response to insertion thereof into said operating position to automatically move said retaining plate to its said closed position.

4. In a cassette tape transport, a housing having a front wall, a continuously visible, highly accessible mounting for a cassette comprising:

a capstan and a pair of spindles extending forwardly from said front wall and engageable respectively with tape and a pair of reels in a cassette in an upright operating position flush against the front surface of said front wall;

means for holding a cassette in said operating position including a pair of stationary locating pins extending forwardly from said front wall and engageable within openings in the cassette, and a spring plate having an inclined forward end portion also extending forwardly from said front wall which is engageable with the bottom forward edge of the cassette and is deflectible during insertion and removal to and from said operating position; and an automatic retaining plate hinged to said front wall above the cassette in said operating position, and being pivotally movable between a closed position against the upper outer surface of the cassette and an open position swung outwardly free of said cassette, overcenter spring means acting between said retaining plate and said front wall holding said retaining plate stably in either position, and an extension carried by said retaining plate which engages a cassette in response to insertion thereof into said operating position to automatically move said retaining plate to its said closed position;

an arm movably mounted in said housing, and supporting a pinch roller aligned with said capstan, and supporting a head, and means for moving said arm to move said pinch roller and head toward and away from a tape within a cassette in said operating position; and said means for moving said arm having means for selectively moving said arm to a first position to engage said head and pinch roller with the tape and press the tape into frictional driving engagement with said capstan, and to a second position to engage said head with the tape but insufficiently to press the tape into frictional driving engagement with said capstan.

5. In a cassette tape transport, the combination of claim 4 in which:

a light source is provided in one locating pin;

a light sensor is provided in said swing arm in position to receive light from said source through a clear leader at either end of the tape; and said retaining plate is hinged to a cover plate attached to said front wall and functions as a light shield over said light senser.

6. In a cassette tape transport, the combination of claim 4 in which said spring plate is mounted along a bottom wall of said housing and is fastened to said housing bottom wall remote from said front wall enabling the entire length under said housing to be deflectible by a cassette upon insertion or removal.

* * * * *

PO-1050 (5/69)

UNITED STATES PATENT OFFICE
CERTIFICATE OF CORRECTION

Patent No. 3,800,323 Dated March 26, 1974

Inventor(s) John P. Jenkins

It is certified that error appears in the above-identified patent and that said Letters Patent are hereby corrected as shown below:

Col. 1, line 45: "carried" should be --carrier--.
Col. 5, line 33: screw "12" should be --142--;
Col. 6, line 59: "coller" should be --collar--;
line 64: between "of" and "vertical" insert --a--.
Col. 7, line 49: "356" should be --256--;
line 59: "sense" should be --senser--;
line 63: "sensors" should be --sensers--.
Col. 8, line 25: "sensor" should be --senser--.
Col.12, line 10: "sensor" should be --senser--.

Signed and sealed this 29th day of October 1974.

(SEAL)
Attest:

McCOY M. GIBSON JR.
Attesting Officer

C. MARSHALL DANN
Commissioner of Patents